United States Patent [19]
Nordmann et al.

[11] 3,750,295
[45] Aug. 7, 1973

[54] MEASURING MACHINE

[75] Inventors: Edwin Nordmann; Gerhard Erler, both of Dresden, Germany

[73] Assignee: Veb Werkzeugmaschinenkombinat "Fritz Heckert" Karl-Marx-Stadt, Karl-Marx-Stadt, Germany

[22] Filed: July 22, 1971

[21] Appl. No.: 165,148

[52] U.S. Cl. ............................................. 33/174 L
[51] Int. Cl. ............................................. G01b 7/00
[58] Field of Search ..................... 33/174 P, 174 R, 33/174 L, 1 M, 23 C

[56] References Cited
UNITED STATES PATENTS

| | | | |
|---|---|---|---|
| 3,164,909 | 1/1965 | Rosenberg | 33/174 L |
| 3,509,635 | 5/1970 | Meinke | 33/174 L |
| 2,723,461 | 11/1955 | Reason et al. | 33/174 L |

*Primary Examiner*—Harry N. Haroian
*Attorney*—Michael S. Striker

[57] ABSTRACT

A measuring machine has two independently driven spindles mounted on two independently driven slides on an independently driven carriage, and a feeler device is mounted on each spindle and has a feeler for sensing a body to be measured, the feelers being connected by an electric measuring circuit with means for recording distances measured along the body.

23 Claims, 14 Drawing Figures

INVENTORS
EDWIN NORDMANN
GERHARD ERLER

BY Michael S. Striker
ATTORNEY

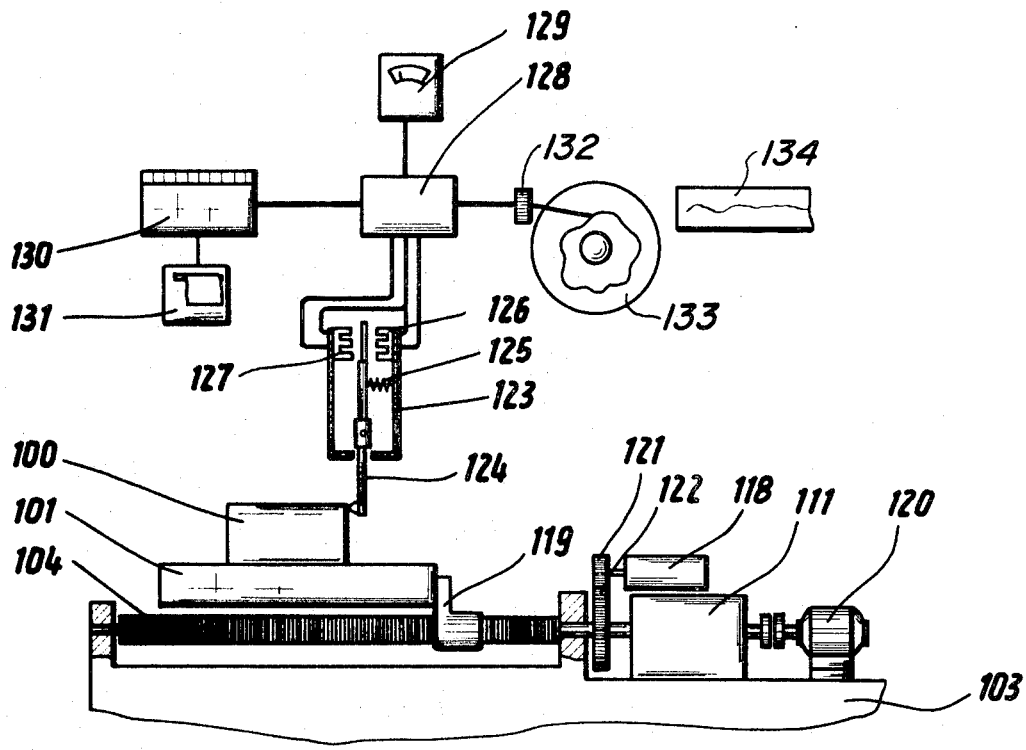
Fig. 2
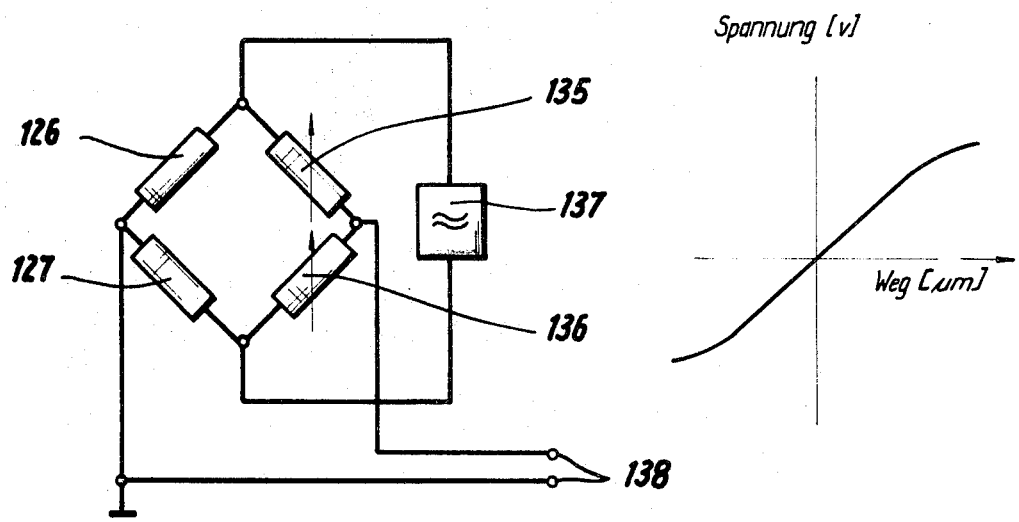
Fig. 3
Fig. 3a

INVENTORS
EDWIN NORDMANN
BERHARD ERLER

BY. Michael S Striker
ATTORNEY

PATENTED AUG 7 1973 3,750,295

INVENTORS
EDWIN NORDMANN
GERHARD ERLER

BY

Michael S. Struker
ATTORNEY

INVENTORS
EDWIN NORDMANN
GERHARD ERLER

BY Michael S. Striker
ATTORNEY

MEASURING MACHINE

BACKGROUND OF THE INVENTION

The present invention relates to a measuring machine with feeler devices which can be selectively operated to move along a straight path, or to rotate in order to carry out measuring operations on prismatic axially symetric bodies.

One group of measuring machines is known in which feeler devices of different shape and size are exchangeably mounted on a holder, and can be inserted into bores, or brought into contact with planar surfaces. The holder of the feeler device is arranged for movement relative to the workpiece to be measured, and the displacement is measured as a distance. The measured values correspond to the actual distance related to the coordinates of the measuring machine.

Another group of known measuring machines employs feeler devices which operate as zero indicator, and measure the deviation from the desired value. The feeler device or the workpiece, or both, are mounted movably in the measuring machine. In some cases, the feeler device is secured to a precision spindle and rotatable determination the same. Measuring machines of this type permit the deermination of deviations from a circular shape. Machines operating with measuring probes have the disadvantage that they are difficult to operate automatically, cannot determine deviations from a desired shape, require a great number of measuring probes, and cause erroneous indications due to inaccurate edges on the workpiece, for example a burr at the end of a bore.

Measuring machines with distance measuring feeler devices have the disadvantage that only axial symmetrical and flat prismatic bodies can be measured if only one spindle is provided. Measuring operation on four lateral surfaces of a prismatic body can be carried out only with special feeler devices. A disadvantage common to all known measuring machines is that due to the required exchanging of the probes, the feeler devices, or other parts, measuring errors are introduced into the feeler system, which are particularly significant if deviations from a position are to be determined, which require repeated clearing of the measuring means in relation to fixed points.

SUMMARY OF THE INVENTION

It is one object of the invention to provide a measuring machine overcoming the disadvantages of the prior art. Another object of the invention is a fully automatic measuring machine, which permits the measuring of five surfaces of a prismatic body without requiring an exchange of a feeler device.

Another object of the invention is to provide a measuring machine with feeler devices which can be rectilinearly moved, rotated, or stopped for carrying out measuring operations on axially symmetrical or prismatic bodies in a fully automatic operation.

Another object of the invention is to provide a measuring machine which fully automatically carries out measuring of five lateral faces of a prismatic body without requiring an exchange of a feeler device or of a measuring probe.

In accordance with the invention, two slides are mounted on at least one carriage, and support precision spindles on which distance measuring sensing devices are supported, and which are parallel and/or slanted to each other predetermined angles, and which are provided with operating means for rotating the spindles, and drive means for moving the slides on which the spindles are mounted. It is possible to mount the two slides on two separate carriages. The precision spindles either serve for directly supporting distance measuring feeler means, or for supporting devices on which one or several feeler means are detachably mounted. In the latter arrangement, it is necessary to provide means for exactly determining the position of the detachable feeler means by interengaging means such as a projection in a corresponding groove so that a plug-and-socket connection for electric conductors accurately fits. Several embodiments of feeler devices can be mounted on each spindle. In accordance with one embodiment, a carrier is secured to a spindle, and supports a slide holding the feeler means for movement transverse to the axis of the spindle. On the other spindle of the machine, a carrier supporting a feeler spindle for rotation is mounted, and the feeler means is detachably attached to the feeler spindle. It is also possible to mount on one spindle, a carrier supporting a turret with several detachable feeler means so that by turning of the turret, different feeler means are placed in an operative position. By using differently constructed feeler means in the turret, the measuring possibilities are increased.

It is advantageous to arrange the feeler spindle in a position perpendicular to the main spindle, and the axes of the two spindles may be located in the same plane, or cross each other. Separate drive means are provided for the main spindle and the feeler spindle. Due to the provision of feeler devices on two main spindles mounted on slides, five lateral faces of a prism can be sensed, and it is advantageous when all spindles are mounted for turning movement, and preferably for indexing movement between angularly spaced arrested positions.

For particular measuring operations, for example the measuring of threads, or the sensing of a cylinder along a spiral line, it is advantageous to move the slide supporting the spindle for rotation, in axial direction of the spindle so that the axial movement is superimposed on the rotational movement of the respective spindle, and a helical motion is given to the feeler device.

During automatic measuring, the feeler of a feeler device is preferably positioned to represent the desired measure of the workpiece surface which is to be measured. The feeler device determines the deviation from the desired value out of this position. In particular cases, for example when a workpiece is to be aligned, when faces with free measuring tolerances are to be measured, or when feeler devices are used which abut a surface to be measured by means of a slide portion, it is necessary that the feeler device controls its motion. For this purpose, the feeler device is positioned by motions of the spindles, or slides, or carriage, and also by other movements of machine parts for determining the necessary coordinates. Before reaching this preliminary position, the speed of movement is reduced from a high speed gradually or stepwise to an extremely slow speed at which the feeler device is further moved toward the workpiece until the feeler means is operated to generate a pulse for terminating the movement, which may be accomplished by varying the inductance of one or two arms of an inductive electric bridge circuit.

For accelerating the approach movement of the feeler device, additional control means such as limit switches or microswitches can be used which obtain the speed reduction from high speed to low speed depending on the position of the feeler engaging the surface of the workpiece to be tested. For recording the measured values, it is necessary to transmit the motions of the spindles, slides, and carriage, and other coordinate determining movements of the machine, accurately and selectively to the transporting means of recording measuring devices. The indication of measured values, which are determined by the feeler devices by capacitive, inductive or pneumatic means, takes place by indicating devices or recording devices, or by a computer which evaluates the measured values.

Between the feeler devices on the spindles, and the measuring means of the machine, which may be an inductive or capacitive measuring amplifier or a pneumatic measuring device, a switching device is provided by which the feeler devices can be adjusted and calibrated independently of each other.

It is also within the scope of the invention that, in addition to feeler devices, the measuring machine carries tool holders for combining measuring with machining operations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a schematic view illustrating a device for measuring and recording distances moved by a supporting table with a workpiece body, and including the first embodiment of a feeler means according to the invention;

FIG. 3 is a circuit diagram illustrating a bridge circuit used in the device of FIG. 2;

FIG. 3a is a diagram illustrating graphically the variation of the voltage in accordance with the distance which a feeler is displaced;

DESCRIPTION OF THE PREFERRED EMBODIMENTS

Figure 1:
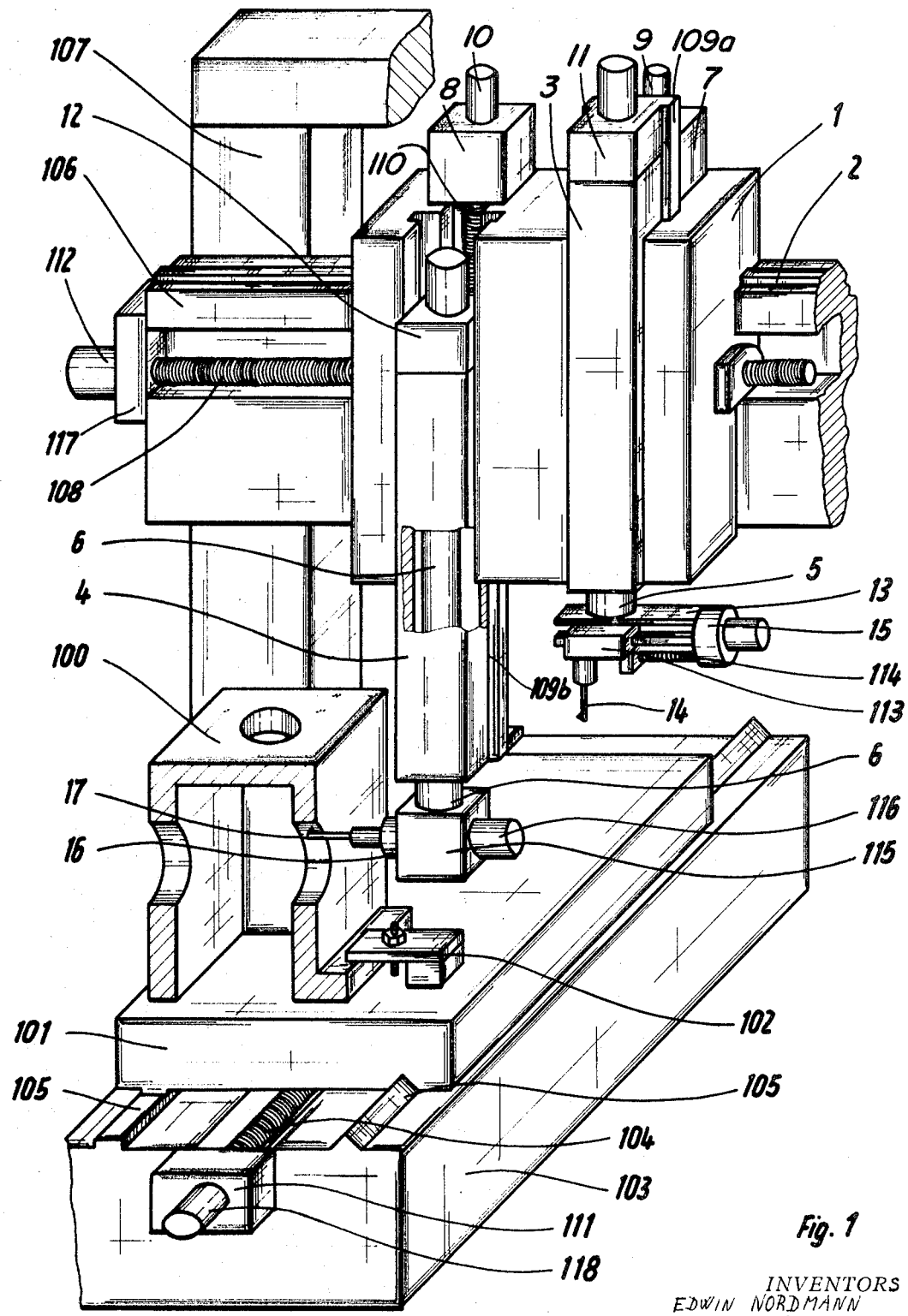
FIG. 1 is a fragmentary perspective view, partially in section, illustrating an embodiment of the invention.
Figure 2A:
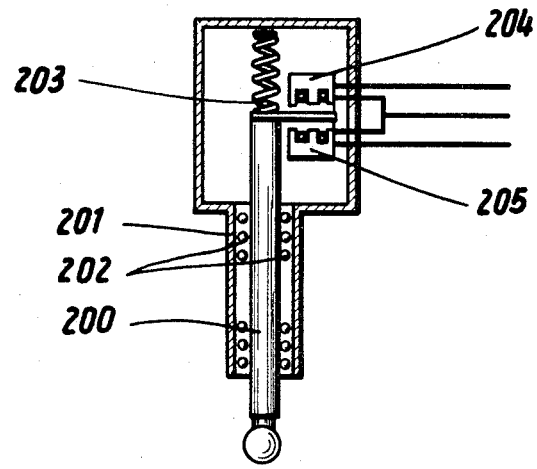
FIG. 2a is a sectional view illustrating another embodiment of a feeler means.

Referring first to FIG. 1, a workpiece body 100 is attached to a machine table by clamping means 102. Machine table 101 is mounted on a machine bed 103 for movement by means of a threaded spindle 104 which is operated by drive means 111, as will be further described with reference to FIG. 2. By displacing machine table 101, workpiece 102 is moved to a position suitable for the measuring operation.

A beam 106 is mounted on two posts 107, of which only one is shown, on the foundation or on the machine bed 103. Beam 106 is mounted on the posts 107 either fixedly secured, or movable in vertical direction. Carriage 1 has guide means 2 for guiding a carriage 1 in a direction perpendicularly to the direction of movement of the machine table 101 with workpiece 100. Carriage 1 has a nut, not shown, engaged by a threaded spindle 108 which is operated by a drive means 112 which is similar to the drive means which will be described with reference to FIG. 2.

Carriage 1 supports two slides 3 and 4 in guide means 109a and 109b for movement in vertical direction toward and away from table 101.

Slides 3 and 4 have nut means, not shown, engaged by threaded spindles of which only the threaded spindle 110 for slide 4 is shown. Spindles 110 are operated by drive means of the type shown in FIG. 2.

Precision spindles 5 and 6 are mounted in slides 3 and 4, respectively, for rotation, but non-movable in axial direction. Precision spindles 5 and 6 are machined to very high tolerances, and supported in corresponding bearings which assure small radial and axial deviations of the precision spindles 5 and 6, and bearings with cylindrical, frusto-conical or spherical surfaces, or high precision ball bearings may be used.

Operating means 11 and 12 are mounted on slides 3 and 4 for rotating precision spindles 5 and 6. Operating means 11 and 12 may include an electromotor and a transmission, or a hydraulic motor, or any other suitable motor obtaining a continuous rotation. It is also possible, for example by disconnecting the motor of the operating means, or by interrupting the transmission to the respective spindle by a clutch, to index the precision spindles 5 and 6 through four angular distances of 90°, or other fractions of a complete revolution. The stopping of precision spindles 5 and 6 in predetermined angular positions is effected by the indexing mechanism shown in FIG. 4, for example.

In the embodiment of FIG. 1, a transverse carrier 13 is secured to the end of spindle 5, and supports a feeler slide 13 with a feeler means 14 for movement in the direction transverse to the axis of spindle 5. A threaded spindle 114 engages a nut, not shown, on feeler slide 113, and is driven by actuating means corresponding to the drive means which will be described with reference to FIG. 2. However, it is also possible to use a hydraulic or pneumatic motor for rotating the threaded spindle 114.

It is also possible to move feeler slide 113 with feeler means 114 by manually rotating the threaded spindle 114, similar to the modification shown on the left side of FIG. 5, which will be described hereinafter.

By moving feeler slide 113 with feeler means 14 in the direction radial to the axis of the spindle 5, the feeler means 14 can be set to different radii related to the axis of rotation of spindle 5. When spindle 5 is rotated, feeler means 14, and more particularly the point of its feeler, moves along a circle about the axis of spindle 5.

In the embodiment of FIG. 1, the spindle 6 supports a carrier or housing 115 in which a precision feeler spindle 16 is mounted for rotation. Feeler spindle 16 is connected with an actuating means 116 which may be of the type which will be described with reference to FIG. 2. The rotation of feeler spindle 16 may be continuous, or feeler spindle 16 may be stepwise indexed as described with reference to spindles 5 and 6. Feeler means 17 is mounted on feeler spindle 16 in a position in which its feeler is perpendicular to the axis of spindle 6. Consequently, the point of the feeler moves along a circle about the axis of spindle 6, but also turns with feeler spindle 16. In this manner, it is assured that the feeler means 14 can assume different positions in the working area of the machine, corresponding to the combination of all possible component movements of spindle 16 and spindle 6.

For determining measured values, the threaded spindles 110 of slides 3 and 4, are provided with measuring devices 9 and 10, respectively, which measure the axial displacement of slides 3 and 4. The threaded spindle 108 of carriage 1 is provided with measuring device 117, while the threaded spindle 104 for moving support table 101 is provided with measuring device 118. The measuring devices permit termination of the displacement of the movable machine parts 3, 4, 1 and 101. Feeler means 14 and 17 permit the transformation of mechanical values, such as distances, into electric values.

In the embodiment shown in FIG. 1, the workpiece is a housing body 100 which has been placed by movement of table 101 in a position suitable for measuring. The feeler device with the feeler means 17 has been moved to a measuring point by displacing carriage 1, and slide 4. Upon arrival of the feeler at the measuring point, the movements are stopped, for example by the variation of the electric signals which will be described with reference to FIG. 3a.

However, it is also possible to move the feeler device to a predetermined desired position, in which event the feeler device has no influence on the control of the movement. In this case, the feeler device measures the deviation from the desired position represented by a desired value.

In the embodiment of FIG. 1, the spindle 16 can be rotated to turn feeler means 17 180°, for example out of the illustrated position, and to carry out a diametrical measuring of the bore in the workpiece 100. By turning the feeler spindle 16, measurements can also be carried out at other portions of the workpiece.

Slide 3 with spindle 5 and feeler device 14 can also be used for measuring operation, particularly if slide 4 is in its upper position. The feeler means 14 is particularly suited for measuring bores which are located in the top plate of workpiece 100. Corresponding to the abovedescribed movements of the feeler means 14, the circular shape, the diameter, and the center of the bore is determined, and it will be seen that in addition to the measuring of the bore, the feeler means 14 and 17 can also measure the surfaces.

Figure 4:
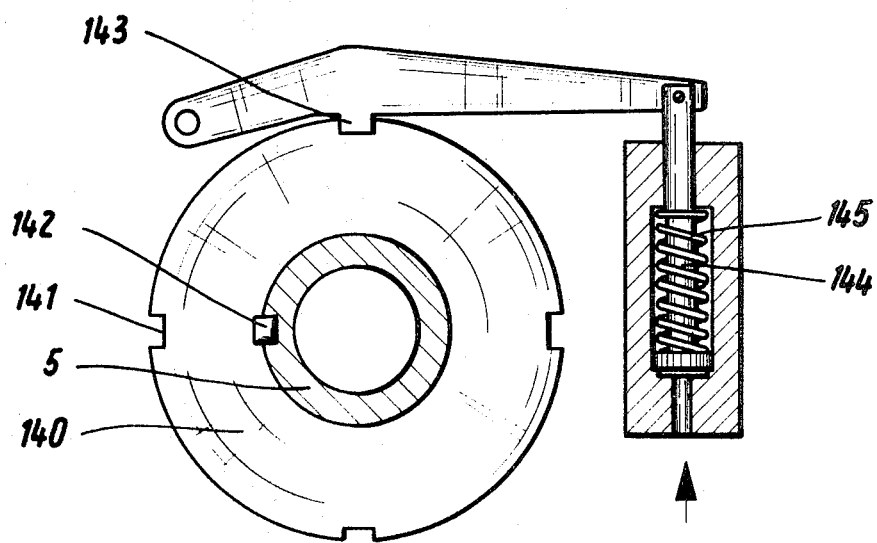
FIG. 4 is a cross-sectional view illustrating the indexing of a spindle for a feeler device.

The angular positions of spindles 5 and 6 and of the corresponding feeler means, can be exactly determined by arresting means, as shown in FIG. 4. An arresting disc 140 has four arresting recesses 141 on the periphery thereof, which are spaced 90° from each other. A different number of equally spaced arresting recesses may be provided. Arresting disc 140 is secured to spindle 5, for example, by a key 42. When a rotational movement of spindle 5 is started, the arresting pawl 143 falls into an arresting recess 141, and stops the movement of the spindle. When the spindle is to be turned, arresting pawl 143 is withdrawn from the respective arresting recess by a hydraulic piston means 144 with which arresting pawl 143 is pivotally connected. The piston is hydraulically actuated, but may be pneumatically or magnetically operated. During the turning movement of the spindle, the arresting pawl 143 slidingly abuts the peripheral surface of arresting disc 140 due to the action of spring 145. The hydraulic pressure in the cylinder housing the piston 144 is reduced so that spring 145 is effective during the turning movement of the spindle.

Referring now to FIG. 2, which illustrates the measuring principle of the machine, the measuring and recording of a distance which a workpiece body 100 moves with table 101 is described by way of example, and it will be understood that the slides 3 and 4, and the carriage 1, and other parts of the machine can be operated in the same way.

The threaded drive spindle 104 of the table 101 is mounted in machine bed 103 for turning movement, but nonmovable in axial direction, and is driven and rotated by the drive means 111. When threaded spindle 104 turns, the nut 119 on table 101 is moved relative to machine bed 103. Drive means 111 includes a motor, for example an electromotor 120.

The position of the movable machine table 101 in relation to the machine bed 103, is determined by the measuring device 118. Coded measuring discs are provided which are photoelectrically sensed. It is also possible to drive the measuring device 118 by a rack bar and pinion. It is also possible to determine the position of table 101 in relation to machine bed 103 by coded linear scales.

Referring now, for example, to the feeler means 17, the same includes a housing 123 in which a feeler 124 is mounted for angular movement. A spring 125 biasses feeler 124 to move to one end position. Two inductive windings 126 and 127, mounted on opposite sides of an arm of feeler 124 on the housing 123, are connected into an electric circuit to form two arms of a Wheatstone circuit which has two other arms 135, 136, as shown in FIG. 3. Instead of inductances, capacitive or ohmic arrangements may be used. A voltage is provided to the bridge circuit by a generator 137, and the inductances of the arms 135, 136 are adjustable. In a neutral position of feeler 124, the bridge arms 135, 136 are adjusted so that the output voltage of the bridge circuit is zero. When feeler 124 moves out of the neutral position by sensing a workpiece body surface, the equilibrium of the bridge circuit is disturbed, and the output voltage appearing on the terminals 136, varies depending on the angular displacement of the feeler 124. While the feeler means shown in FIG. 2 responds to angular displacements of feeler 124, axial displacement of feeler 200 is provided in the feeler means shown in FIG. 2a. Feeler 200 is mounted in a housing 201 in axial guide means 202 and biassed by a spring 203 out of a neutral position. Two inductive windings 204 and 205, connected into an electrical bridge circuit, as described with reference to FIG. 3, respond to displacement of feeler 200 with a magnetizable core mounted thereon out of a neutral position.

As shown in FIG. 2, the bridge circuit of FIG. 3 is part of measuring means 128 which is connected with an indicator 129, a counter or computer 130 having print out means 131, and at least one recording means which has a rotary record carrier 133 or a rectilinearly moving record carrier 135. A recording stylus 132 controlled by the measuring device 128 is shown to record a polar graph on record carrier 133, and a rectilinear graph on record carrier 134.

Evidently, the output voltage at terminals 138 can be adapted by amplifiers, rectifiers and other means in accordance with the construction of the measuring and recording devices 129, 130, 131, 132.

FIG. 3a illustrates graphically the variation of the output voltage V over the distance measured in micromillimeters. The illustrated variation of the voltage is obtained by rectifying the output voltage of the bridge circuit depending on the phase. In this manner, a positive voltage represents a distance in one direction, which may be considered positive, while a negative voltage corresponds to a distance of movement in the opposite direction, which may be considered negative. Each distance is associated with a correlated voltage, so that the voltage variation is suitable for the measuring of distances of displacement, and also regarding the direction of the displacement. The voltage variation is also suitable for controlling the drive means 111 with motor 120, for example by disconnecting and rapidly braking motor 120 to a stop at the end of a travelled distance.

Figure 12:
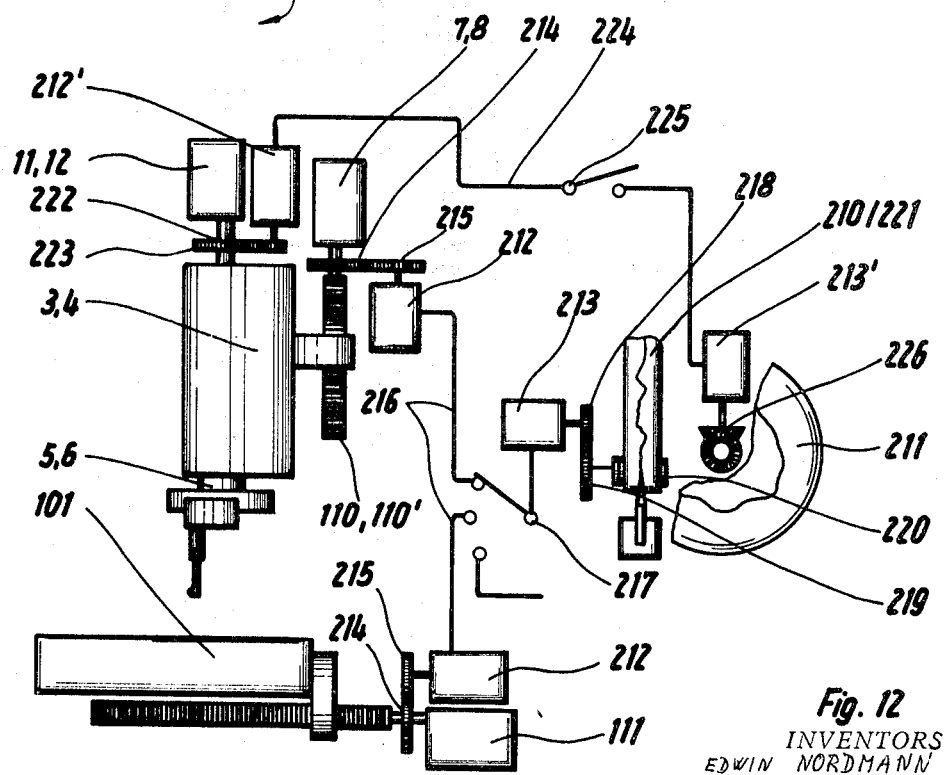
FIG. 12 is a diagrammatic view illustrating the transmission of measuring signals to recording devices.

Referring now to FIG. 12, recording means 210 for linear operations, and recording means 211 for rotary operations are respectively provided with record carriers moving in one straight direction, and rotating record carriers. Electric rotary field systems are used, which include rotary field generators 212, 212', and rotary field receivers 213, 213'. The movements of slides 3 and 4 is effected by drive means 7, 8 and threaded spindles 110, 110', as explained with reference to FIG. 1. Only one slide 3 or 4 is shown in FIG. 12 for the sake of simplicity. The displacement of table 101 supporting the workpiece body 100 is effected by drive means 111 and threaded spindle 104. The independent drive means 7, 8 for the slides, and 111 for the table and 112 for the carriage 1 operate the rotary field generators 212 which are connected by conductors 216 and a selector switch 217 with the rotary field receivers 213. Due to the provision of rotary field generators and receivers, the rotational movement represented by the rotary field generator 212 is electrically and synchronously transmitted to the rotary field receiver 113 which drives by means of gears 218, 219 the transporting roller 220 for the record carrier of recording means 210. Selector switch 217 serves the purpose of selectively transmitting the displacement of table 101, or of slides 3, 4 to the transporting roller of the recording means.

It is also possible to replace gears 218, 219 by change gears or a variable gear transmission, permitting different longitudinal enlargements of the recordings. The operating drive means 11, 12 of spindles 5, 6 drive through change gears 222, 223 the rotary field generator 212' which is transmitted by conductors 224 and a switch 225 to the rotary field receiver 213' which through a gear transmission 226, drives the record carrier for polar operations in recording means 211, synchronous with the rotation of the respective spindle 5, 6. Switch 225 serves for starting or stopping the rotational movement of the record carrier, or may be constructed as a selector switch with several switch positions in order to use the same recording device for several spindles.

Figure 10:
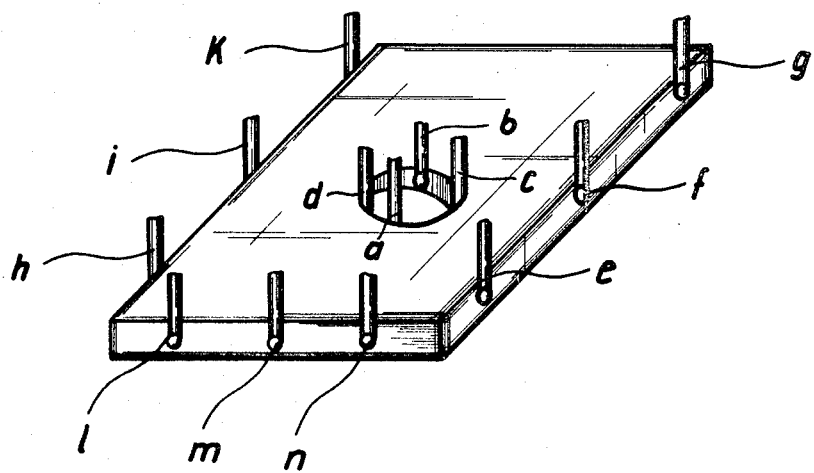
FIG. 10 is a perspective view illustrating a workpiece, and schematically showing the sensing of surfaces of the same.

FIG. 10 illustrates a workpiece in the form of a flat prismatic body while being sensed by the above-described feelers. Under consideration of the diameter of the feeler point, the diameter of a central bore in the workpiece can be determined from the sensed measuring points $a, b, c, d$. The measured pointse, $f, g$ of one lateral face, and the measuring points $h, i, k$ of the opposite lateral face, determine the width of the workpiece body, and indicate whether the two lateral faces are parallel to each other.

The determination of the angle between the faces measured at measuring points $l, m, n$ and $e, f, g$, respectively is possible by a comparison of the measuring points. The number of measuring points for each surface is variable, and is determined in accordance with the size and shape of the measured object. The feeler devices determine a deviation from a desired value, when the feeler device is placed by operation of the carriage, slides, and table, and the distance measuring systems to the desired position of the respective measured value, or the feeler systems control the movement of the carriage, slides, and table which is stopped when a zero position is obtained and the respective distance measuring system is read out, or the feeler systems control the movement of the threaded shafts by which the carriage, slides, and table are moved. When a threaded shaft stops, the distance measuring systems and the measured value of the feeler systems are read out and together computed.

Figure 5:
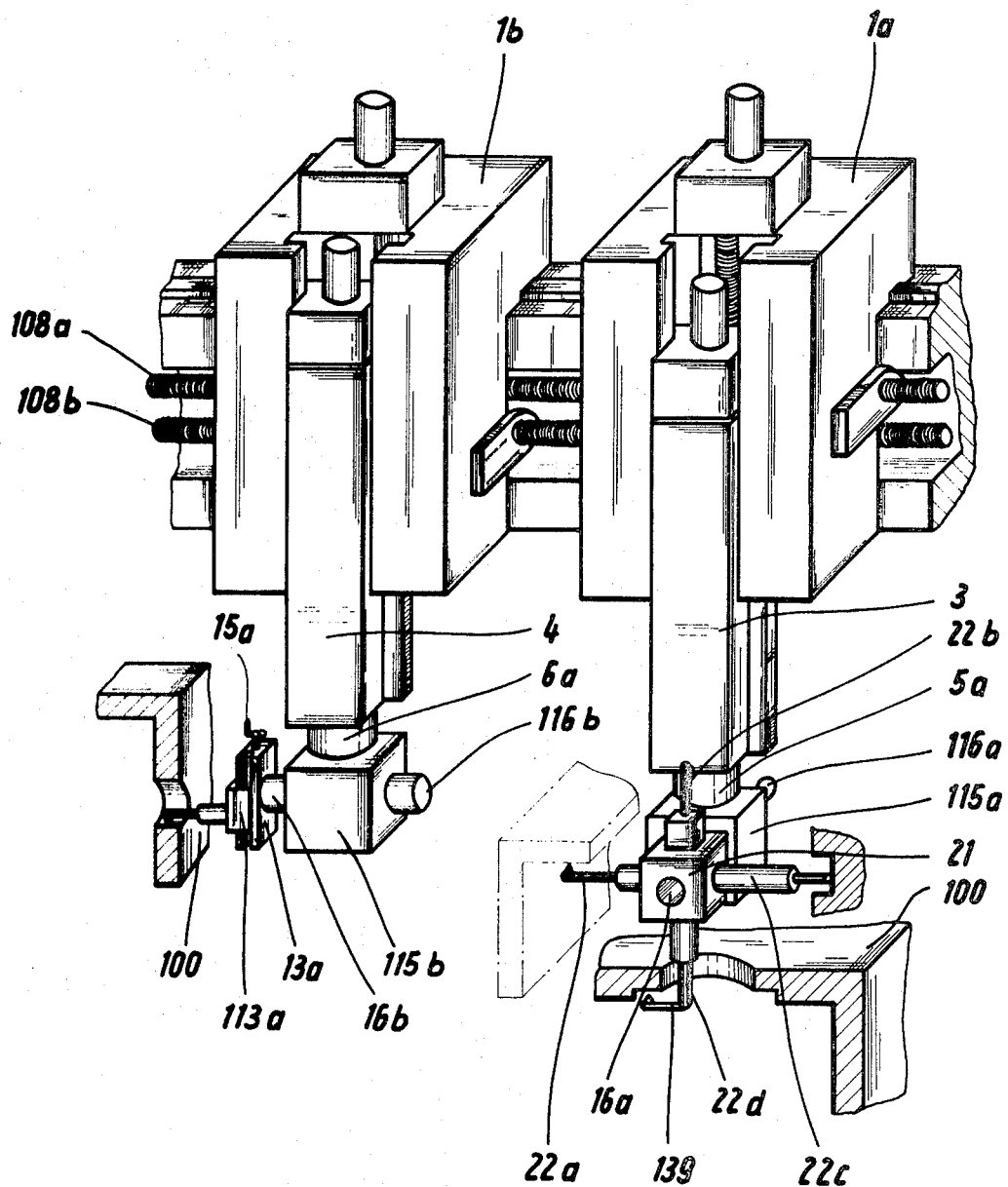
FIG. 5 is a fragmentary perspective view, partially in section illustrating a second embodiment of the invention in which slides are mounted on separate carriages, and in which a turret and a slide are used for supporting feeler means.

FIG. 5 illustrates another embodiment of the invention in which the slides 3, 4 are mounted on separate carriages 1a and 1b. The displacement of the carriages 1a, 1b is effected by threaded spindle 108a and 108b so that carriages 1a, 1b, with the respective slides 3, 4, can be moved independently of each other by drive means corresponding to the drive means described with reference to FIGS. 1 and 2.

A carrier or housing 115a is secured to the end face of precision spindle 5a, which corresponds to spindle 5 of the embodiment of FIG. 1. A feeler spindle 16a is mounted in the housing 115a, extending perpendicularly to the axis of spindle 5a. Feeler spindle 16a carries a turret 21 to which four feeler means 22a, 22b, 22c and 22d are detachably attached. The feeler means sense displacements to be measured, as described with reference to feeler means 124, 123 in FIG. 2.

The feeler means 22a corresponds substantially to the feeler means 17 in FIG. 1. Feeler means 22a are shown in a position sensing the bottom surface of a workpiece body. Feeler means 22b serves for measuring the surface condition of workpieces, as will be described in greater detail with reference to FIGS. 7 to 9. Feeler system 22c is shown in greater detail in FIG. 2a, described above, and is suitable for the sensing of surfaces located below the surface of the workpiece body, for example the surface of a groove. Feeler means 22d can also be attached to the turret 21, and operates similar to the feeler means 17 of FIG. 1, but the feeler 139 is angular for sensing a surface within the workpiece 100 located around a bore.

It will be understood that the feeler means described with reference to FIGS. 1 and 5 are not all simultaneously used. However, it is possible to place the feeler devices by corresponding movements of spindles 16a and 5a, and also 16a, successively in positions required for measuring the workpiece body.

Spindle 6a supports a carrier or housing 115b in which a feeler spindle 16b with an operating drive means 116b is mounted. Means 6a, 115b, 16b, 116b correspond to the means 6, 115, 16, 116 described with reference to FIG. 1. Feeler spindle 16b, which is perpendicular to spindle 6a, supports a transverse carrier 13a in which a feeler slide 113a supporting a feeler means 14a is mounted. Means 13a, 113a, 14 a correspond to means 13, 113 and 14 in FIG. 1. The actuating means for the feeler means is shown to be a manually operated handle 15a by which a spindle engaging a nut in feeler slide 113a is rotated.

The arrangement permits the measuring of bores in lateral surfaces of the workpiece 100. Evidently, each feeler device shown in FIG. 1 can be replaced by one of the feeler devices shown in FIG. 5, and each feeler device shown in FIG. 5 can be replaced by one of the feeler devices shown in FIG. 1, if the shape of the workpiece body requires a particular position of the feelers.

Figure 6:
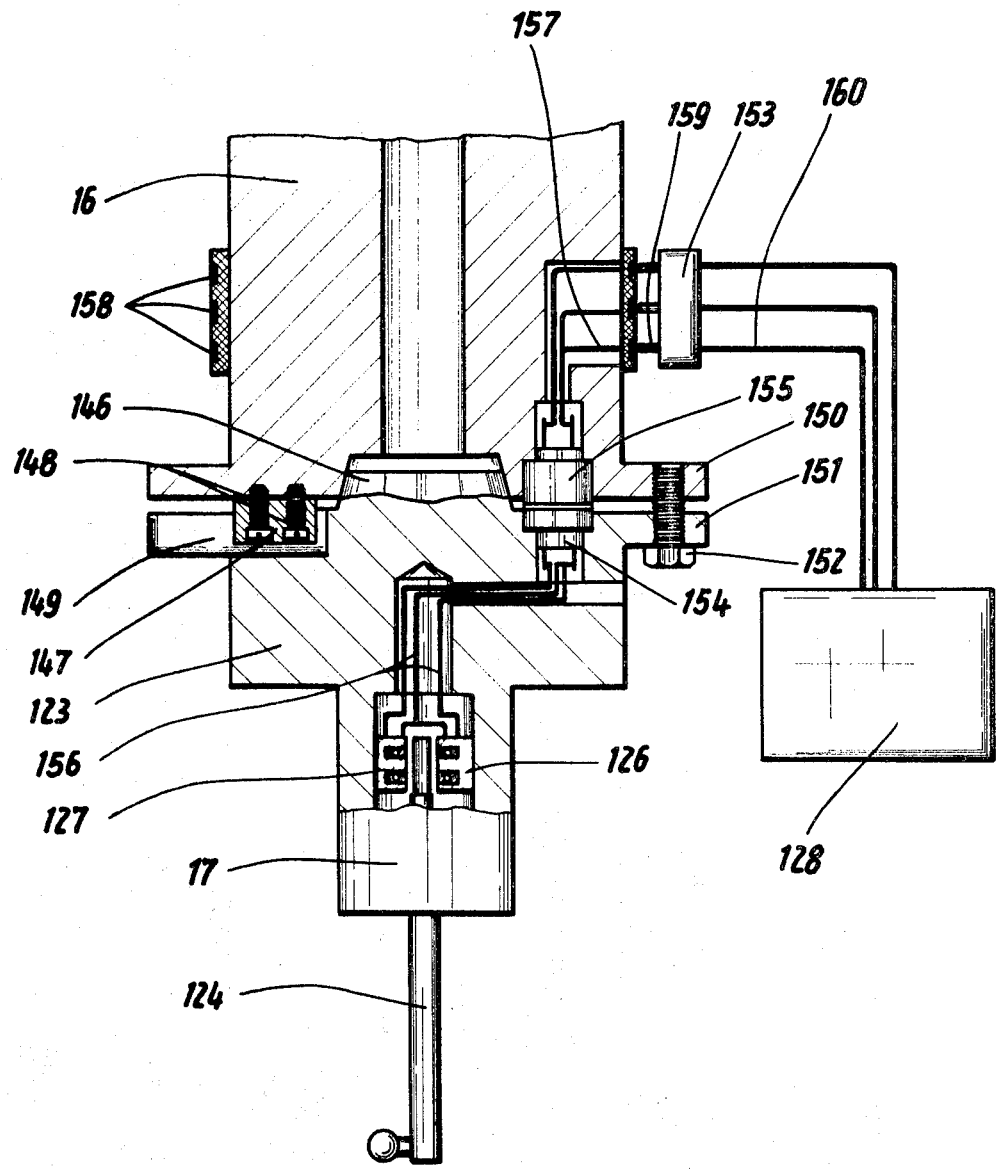
FIG. 6 is a sectional and partly diagrammatic view, illustrating the attachment of a feeler means to a feeler spindle, and the establishment of electric connections upon attachment.

FIG. 6 illustrates a detail of FIG. 1, namely the mounting of the feeler means 17 on the feeler shaft 16. A carrier 123 supports a feeler 124 for angular movement, and the inner end of feeler 124 has a magnetizable core located between two inductive windings 126 and 127, as described with reference to FIG. 2. Carrier 123 has a central frusto-conical attaching portion 146 projecting into and frictionally engaging a corresponding frusto-conical recess in the end face of feeler shaft 16. The angular position of carrier 123 is exactly determined by a prismatic member 147 secured by screws 148 to the end face of feeler spindle 16, and projecting into a corresponding radial groove 149 in the end face of carrier 123. The prismatic projection 147 fits exactly into the groove 149 so that no angular displacement of the feeler means 123, 124 relative to the feeler spindle 16 is possible. Feeler spindle 16 has an end flange 150, and feeler carrier 123 has an end flange 152 which are secured to each other by screws 152.

The electric signals or pulses in conductors 156 produced by windings 126, 127 upon displacement of feeler 124, must be transmitted to the other arms of the electric bridge circuit, which has been described with reference to FIG. 3, and is locatedd in the measuring means 128 described with reference to FIG. 2, and also shown in FIG. 6. Carrier 123 has a plug connected with conductors 156, and having two prongs projecting into a socket 155 mounted in the end face of feeler spindle 16. Conductors 157 are connected with the socket, and lead in the interior or feeler spindle 16, to three insulated slide rings 158 being engaged by three slide contacts 159 supported on a stationary member 103 and connected by conductors 160 to the other arms of the bridge circuit in measuring means 128. Due to the construction of FIG. 6, the feeler means 123, 124, or a modified feeler means, can be attached to feeler spindle 16 in a position in which the plug-and-socket means engage each other, and can be secured by screw 152.

Figure 7:
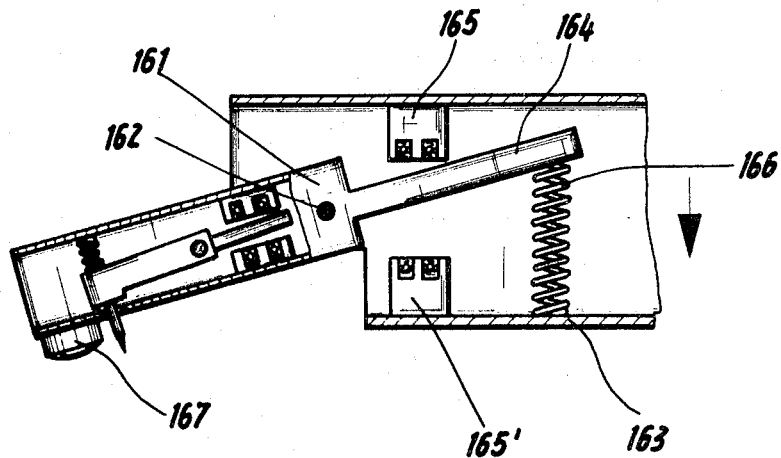
FIG. 7 is a sectional view illustrating another embodiment of a feeler means according to the invention in an inoperative position.
Figure 8:
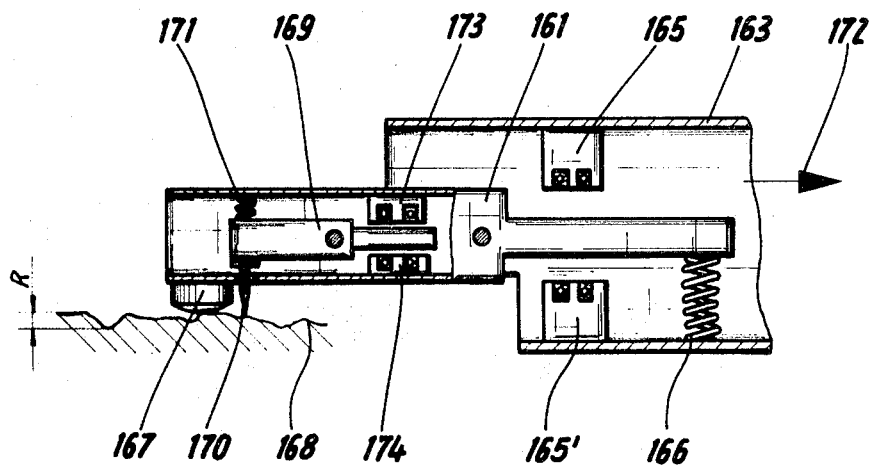
FIG. 8 is a sectional view corresponding to FIG. 7 but illustrating the operative position of the feeler means.

FIG. 7 illustrates a feeler means 22d as used in the turret 21 in the embodiment of FIG. 5. A carrier 163 can be detachably mounted in the turret, and supports a feeler means 161 for angular movement about a pivot 162. Arm 164 of feeler means 161 serves as a magnetizable core for influencing the windings 165, 165', as described above. A spring 166 urges feeler means 161, 164 to one end position. Feeler means 161 has a slide portion 167 at one end which is adapted to slide on the surface 168 of a workpiece, as shown in FIG. 8. The feeler 169 is mounted in feeler means 161 for angular movement about a pivot, and has a core portion cooperating with two other windings 173, 174 connected with another bridge circuit. A spring 171 urges feeler 169 to turn in one direction so that, when slide portion 167 engages and slides on the crests of an irregular workpiece surface 168, feeler point 170 moves into the valleys of the irregular surface 168 so that the displacement of feeler 169 causes a signal from windings 173, 174. FIG. 8 illustrates the feeler means in the measuring position in which the voltage in windings 165, 165' has caused stopping of the part carrying feeler member 161, as described with reference to FIG. 4. The displacement of feeler 169 for the depth R of the surface irregularities takes place during movement of the carrier 163 in the direction of the arrow 172.

The inductive windings 173, 174 whose current variations represent distances, obtained by movements of feeler 169 which indicate the shape of the surface 168 of the workpiece body.

Figure 9:
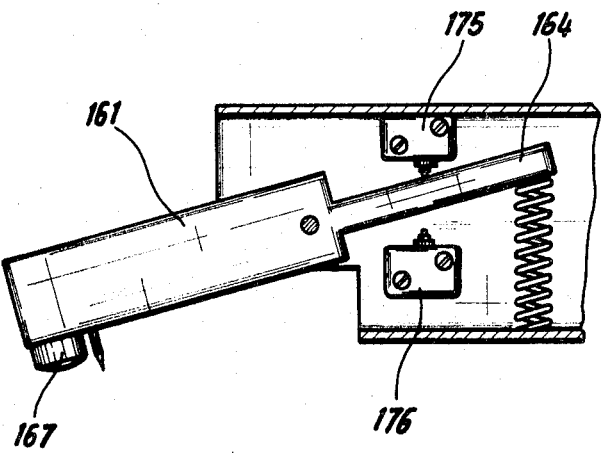
FIG. 9 is a sectional view of further modified feeler means.

The feeler means 22b mounted on turret 21 of the embodiment of FIG. 5, may be constructed as shown in FIG. 9. The feeler means 161, which corresponds to the feeler means 161 in FIG. 7 does not cooperate with inductive windings 165, 165', but with microswitches 175, 176 which have actuators respectively ngaged by the arm 164 upon angular displacement of feeler means 161.

The positioning of the feeler means 22b takes place, as shown in FIG. 2, by means of the threaded spindle 104, for example, which is driven by electromotor 120. The distance measuring means 118 is driven by gears 121, 122 which responds to, and represents the position of the threaded spindle 104 and of the drive means 111, 120.

Before the desired position of the threaded spindle and of the part controlled by the same is reached, at a measuring point, the control means of the machine reduce at a predetermined point the speed of movement from a high approach speed to an intermediate speed at which the slide portion 167 of feeler means 161 shown in FIGS. 7 and 8, first engages the workpiece surface 168. During the further movement, feeler means 161 is displaced out of its angular end position shown in FIGS. 7 and 9 to the position shown in FIG. 8. At the beginning of the angular movement of feeler 161 relative to its carrier 163, switch 145 opens, and effects reduction of the speed to an extremely low speed at which the threaded spindle rotates until feeler means 161 is in the measuring position. When the measuring position is reached, switch 176 stops the drive movement of the threaded spindle, for example spindle 104. It is possible to combine the inductive windings 165, 165' with the switches 165, 176 in which switches 175, 176 reduce the speed, while the winding 165, 165' effect the stopping of the rotation of the threaded spindle, as described with reference to FIG. 4.

For particular measuring purposes, it is necessary to move any one of precision spindles 5 and 6 not only in a rotational movement, as described above, but also in an axial movement. This is obtained by moving the slide of the respective spindle in axial direction of the same under the control of the same operating drive means which rotate the spindle.

Figure 11:
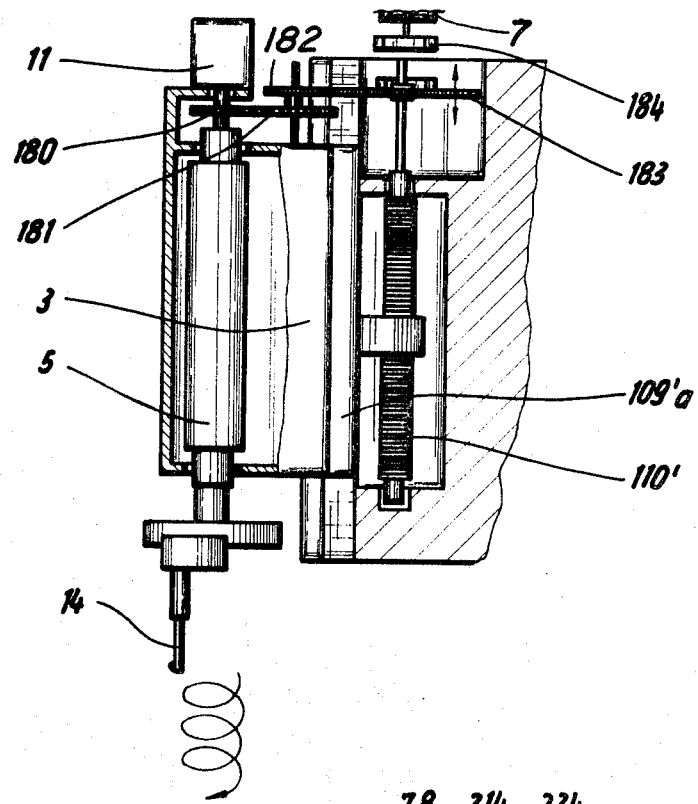
FIG. 11 is a fragmentary sectional view illustrating the means for axially moving a slide carrying a rotating spindle with a feeler device.

FIG. 11 shows an arrangement in which precision spindle 5 is supported in slide 3 by bearings rotatable, but non-movable in axial direction. Operating means 11, which may include an electric motor, are connected with spindle 5 for rotating the same together with the feeler means 14. Slide 3 has guide means 109'a which are guided on carriage 1 for movement with slide 3 in axia' direction of the spindle 5. A threaded spindle 110' engages a nut secured to slide 3 so that rotation of threaded spindle 110' causes axial movement of slide 3 and spindle 5. The rotational movement of spindle 5 is transmitted by meshing gears 180, 181, 182 and an axially shiftable clutch gear 183 to the threaded spindle 110'. In the illustrated lower position of the clutch gear 183, the coupling member 184 which is rotated by drive means 7, is spaced from clutch gear 183 so that no driving torque is transmitted from drive means 7 to the threaded shaft 110'. Consequently, threaded spindle 110' is driven only by operating drive means 11, which rotates the spindle so that the axial movement of slide 3 together with spindle 5 takes place in synchronism with the rotational movement of the spindle 5.

The gear train 180, 181, 182, 183 may be replaced by a variable transmission, or constructed with change gears so that the axial displacement of slide 3 with spindle 5 can be varied in relation to the rotational movement of spindle 5. When clutch gear 183 is shifted to its upper position, threaded spindle 110' is disconnected from the operating drive means 11, and connected by coupling member 184 with the drive means 7 so that the axial movement of slide 3 is entirely independent of the rotational movement of spindle 5.

It will be understood that each of the elements described above, or two or more together, may also find a useful application in other types of measuring machines differing from the types described above.

While the invention has been illustrated and described as embodied in a measuring machine with two precision spindles which can be moved in several directions and carry feeler means transmitting electric signals to a measuring circuit including measuring and recording means, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Measuring machine comprising supporting means for a workpiece body to be measured; at least one carriage means mounted on said supporting means for movement along a path; at least two slides mounted on said carriage means for independent movement transverse to said path; drive means for independently moving said carriage means and said slides, and including distance measuring devices; a spindle means mounted in each slide for rotation; at least one feeler device mounted at one end of each spindle means for measuring distances each feeler device including a feeler means having a movable feeler adapted to be displaced by said body when in contact with the same; an operating means mounted on each slide for rotating and indexing the respective spindle means with the respective feeler device; and an electric measuring circuit means including measuring means operated by said operating means and said measuring devices, and being responsive to displacements of said feelers by said body.

2. Measuring machine as claimed in claim 1 wherein the feeler device of one of said spindle means includes a carrier secured to said one end of one spindle means for turning movement with the same about a first spindle axis, a feeler slide supporting said feeler means and being mounted on said carrier for movement in directions radial to said first spindle axis, and actuating means for moving said feeler slide with said feeler means and feeler.

3. Measuring machine as claimed in claim 2 wherein said feeler means is mounted on said feeler slide in a position in which said feeler is parallel to said first spindle axis, and means on said carrier guiding said feeler slide for movement in a direction perpendicular to said first spindle axis.

4. Measuring machine as claimed in claim 2 wherein said feeler means is mounted on said feeler slide in a position in which said feeler is perpendicular to said first spindle axis, and means on said carrier guiding said feeler slide in a direction parallel to said first spindle axis.

5. Measuring machine as claimed in claim 2 wherein the other feeler device includes an other carrier secured to said one end of said other spindle means for rotation with the same about a second spindle axis, a feeler spindle mounted on said other carrier for rotation about a feeler axis perpendicular to said second spindle axis, wherein said feeler means of said other feeler device is mounted on one end of said feeler spindle in a position in which said feeler thereof is parallel with said feeler axis, and actuating means for rotating and indexing said feeler spindle mounted on said other carrier.

6. Measuring machine as claimed in claim 5 wherein said first and second spindle axes are parallel with each other.

7. Measuring machine as claimed in claim 1 wherein one feeler device includes a carrier secured to said one end of one spindle means for rotation with the same about a spindle axis, a feeler spindle mounted on said one carrier for rotation about a feeler axis perpendicular to said spindle axis, wherein said feeler means of said one feeler device is mounted on one end of said feeler spindle in a position in which said feeler thereof is parallel with said feeler axis, and actuating means for rotating and indexing said feeler spindle mounted on said one carrier.

8. Measuring machine as claimed in claim 1 wherein at least one of said feeler devices includes a carrier mounted at one end of one of said spindle means; a turret mounted on said carrier for angular movement about a turret axis perpendicular to the axis of said one spindle means, a plurality of feeler means mounted on said turret angularly spaced about said turret axis, and indexing means for stepwise turning said turret, and wherein said feeler means have feelers projecting perpendicularly to said turret axis from said carrier.

9. Measuring machine as claimed in claim 8 wherein at least one of said feelers is angular and has a feeler end portion perpendicular to said feeler axis and to said axis of said spindle means.

10. Measuring machine as claimed in claim 1 including transporting means for moving at least one of said slides in axial direction of the spindle means mounted therein for rotation; and coupling means operable for selectively coupling said transporting means with said drive means and said operating means of the respective spindle means so that when said operating means is connected with said transporting means, said slide moves said spindle means in axial direction in timed relation with the rotation of said spindle means and of said feeler device thereon.

11. Measuring machine as claimed in claim 1 wherein at least one of said feeler devices includes a carrier secured to one end of one of said spindle means, a feeler spindle mounted in said carrier for rotation about a feeler axis, and having an end portion with a first attaching means located in said feeler axis, and wherein said feeler means includes an attaching portion having a central second attaching means engaging said first attaching means for frictionally holding said feeler means on said feeler spindle; and interengaging means on said end portion and said attaching portion spaced from said feeler axis for holding said feeler means in a predetermined angular position of said feeler shaft; wherein said electric measuring circuit means includes first and second electric conductors in said end portion and in said attaching portion, respectively; and plug and socket means connecting said first and second conductors in said predetermined angular position.

12. Measuring machine as claimed in claim 1 wherein said electric measuring circuit means include contact rings surrounding said end portions of said feeler spindle, and slide contacts in contact with said contact rings during rotation of said feeler spindle and connected with said measuring means.

13. Measuring machine as claimed in claim 1 wherein said supporting means include a movable table for supporting the body; wherein said drive means include a plurality of motors for driving said carriage means, slides, and table; wherein said electric measuring circuit means include first means responsive to movement of any one of said feelers to produce a voltage depending on the displacement of said one feeler, and second means for stopping at least one of said motors responsive to a predetermined produced voltage.

14. Measuring machine as claimed in claim 13 wherein said first means include an electric inductive bridge circuit; and wherein said one feeler is movable between two arms of said bridge circuit for varying the voltage of said bridge circuit.

15. Measuring machine as claimed in claim 1 wherein said measuring means include recording means, and means for selectively transmitting the movements of said spindle means, slides, and carriage to said recording means.

16. Measuring machine as claimed in claim 15 wherein said measuring circuit means include means for selectively transmitting the movements of said feelers to said recording means.

17. Measuring machine as claimed in claim 1 wherein said measuring means includes recording means; wherein said measuring circuit means include a rotary field generator operated by each drive means and by each operating means, and at least one rotary field receiver means connected with said rotary field generator for operating said recording means to register measured sitances and angles.

18. Measuring machine as claimed in claim 17 wherein said measuring circuit means includes means for successively connecting said rotary field receiver means with said rotary field generators.

19. Measuring machine as claimed in claim 18 wherein said recording means include a recording device for linear movement, and a recording device for angular movement; and wherein said rotary field receiver means includes a rotary field receiver for each of said recording devices.

20. Measuring machine as claimed in claim 1 wherein said measuring circuit means connects said feelers with said drive means for controlling the same; and wherein said measuring means indicate measured distances and angles when said drive means are stopped.

21. Measuring machine as claimed in claim 1 wherein at least one of said feeler devices includes a carrier, a feeler means pivotally mounted on said carrier, a spring means biassing said feeler means to turn in one direction, and first two control means mounted on said carrier on opposite sides of said feeler means for generating signals when approached by said feeler means in different angular positions; and wherein said feeler means includes a support part between said control means, and a feeler pivotally mounted thereon, a spring biassing said feeler, and two second control means on said support part on opposite sides of said feeler for generating signals upon movement of said feeler.

22. Measuring machine as claimed in claim 21 wherein said first control means are two switches operated by said feeler means and connected into said measuring circuit, and wherein said second control means are inductive windings varying the inductance thereof upon displacement of said feeler and connected into said measuring circuit.

23. Measuring device as claimed in claim 21 wherein said support part has a slide portion for sliding on the surface of a body, and wherein said feeler has a point engaging the surface of said body adjacent said slide portion.

* * * * *